United States Patent [19]

Blackburn et al.

[11] Patent Number: 4,755,581

[45] Date of Patent: Jul. 5, 1988

[54] THERMOSETTING HIGH SOLIDS COATING COMPOSITION OF EPOXIES, POLYOLS AND ANHYDRIDES

[75] Inventors: William P. Blackburn, Evans City; Ronald R. Ambrose, Allison Park; Samuel Porter, Jr., Natrona Heights; Mary Jo Burkholder, Mars, all of Pa.

[73] Assignee: PPG Industries, Inc., Pittsburgh, Pa.

[21] Appl. No.: 898,665

[22] Filed: Aug. 21, 1986

[51] Int. Cl.$^4$ .................. C08G 59/42; C08G 59/62
[52] U.S. Cl. ................... 528/93; 528/110; 528/297
[58] Field of Search .............. 528/110, 297, 93

[56] References Cited

U.S. PATENT DOCUMENTS

| | | | |
|---|---|---|---|
| 2,830,031 | 4/1958 | Fisch | 528/110 X |
| 2,890,196 | 6/1959 | Phillips et al. | 528/297 |
| 2,890,197 | 6/1959 | Phillips et al. | 528/297 X |
| 2,891,034 | 6/1959 | Fisch | 528/297 X |
| 2,935,488 | 5/1960 | Phillips et al. | 528/297 X |
| 2,944,996 | 7/1960 | Berenbaum | 528/110 X |
| 2,985,616 | 5/1961 | McGary et al. | 528/297 |
| 3,000,848 | 9/1961 | McGary et al. | 528/297 |
| 3,188,362 | 6/1965 | Delmonte | 528/110 X |
| 3,278,636 | 10/1966 | Wynstra | 528/297 X |
| 3,431,237 | 3/1969 | Harry | 528/110 |
| 3,523,143 | 8/1970 | Kwong | 528/110 X |
| 3,555,111 | 1/1971 | Benham | 528/110 X |
| 3,557,035 | 1/1971 | Schmid et al. | 528/297 X |
| 3,897,514 | 7/1975 | Allabashi | 528/297 X |
| 4,532,274 | 7/1985 | Spurr | 528/110 X |

*Primary Examiner*—Earl Nielsen
*Attorney, Agent, or Firm*—Godfried R. Akorli

[57] ABSTRACT

Disclosed herein are high solids thermosetting coating compositions comprising polyepoxides and anhydrides as effective curing agents therefor. Films from these coating compositions are of remarkable appearance and are attended by remarkably low volatile organic content (VOC).

12 Claims, No Drawings

THERMOSETTING HIGH SOLIDS COATING COMPOSITION OF EPOXIES, POLYOLS AND ANHYDRIDES

BACKGROUND OF THE INVENTION

1. Field of the Invention

The present invention is in the field of crosslinkable compositions comprising epoxy resins and anhydride curing agents. More specifically, the present invention relates to crosslinkable coating compositions having low volatile organic content which are particularly useful in color-plus-clear coating applications.

2. Brief Description of the Prior Art

Color-plus-clear coating systems involving the application of a colored or pigmented base coat to a substrate followed by the application of a transparent or clear top coat to the base coat are becoming increasingly popular as original finishes for automobiles. The color-plus-clear systems have outstanding gloss and distinctness of image, and the clear coat is particularly important for these properties. Illustratively, two-pack clear coat compositions comprising polyols such as polyester polyols, polyurethane polyols and acrylic polyols, and polyisocyanate curing agents give outstanding gloss and distinctness of image.

It is an object of the present invention to provide for a novel crosslinkable composition which provides for coatings which can be used in a wide variety of coatings applications. It is particularly the object of the present invention to prevent a curable high solids coating composition which can provide excellent adhesion, gloss and distinctness of image enabling the coating composition to be used as clear coats in a color-plus-clear coating system, particularly for use as an original finish for automobiles. It is furthermore the object of this invention to provide such a high solids curable composition having low volatile organic content (VOC).

SUMMARY OF THE INVENTION

In accordance with the foregoing, the claimed invention encompasses a high solids thermosetting coating composition which is characterized by high sprayability, acceptable sag control, very low volatile organic content (VOC), and other desirable film properties. Said coating composition comprises:

(a) a low molecular weight polyepoxide,
(b) a low molecular weight hydroxyl group-containing polyfunctional material, and
(c) a curing agent consisting essentially of an anhydride, said coating composition is characterized in that it is curable in the absence of another curing agent such as a melamine to provide a hard and solvent resistant coating.

In the particularly preferred embodiment of this invention, the coating compositions typically contain a cure catalyst such as tertiary amines or ammonium salts. The coating compositions of this embodiment have been found to be particularly suited to painting automobiles in the color-plus-clear mode to provide coatings having outstanding appearance and other desirable properties.

In this text, the terms molecular weight, solids content, sprayability, volatile organic content (VOC) and appearance are defined as follows. The term "molecular weight" refers to a number average molecular weight as determined by gel permeation chromatography using a standard (such as polystyrene or glycol). Therefore, it is not the actual number average molecular weight which is measured but a number average molecular weight which is relative to the standard.

The solids (i.e., the non-volatile) content of a composition is determined by ASTM D-2369 testing modified as follows: 0.3 grams of the composition is mixed with 5 milliliters of 1:1 mixture of acetone and tetrahydrofuran and heated at 110° C. for 1 hour in a forced draft oven. The composition is then cooled in a desiccator, reweighed and the non-volatile content calculated. The percentage by weight of the composition remaining is the solids content.

The term "sprayability" means the maximum concentration of solids at which the coating composition can form a uniformly deposited coating, under normal spraying conditions of, say, temperature, pressure, and spray equipment design such as entails the use of an air suction gun operating at 60 psi with a No. 30 air cap. This maximum concentration is solvent dependent and usually occurs in a viscosity range of about 20 to 80 and preferably at about 20 to 24 seconds with a No. 4 Ford cup at room temperature after thinning with a solvent such as a mixture of methyl amyl ketone and ethoxyethyl acetate. Above this maximum concentration, appearance of the coating as manifested by say leveling and solvent popping typically becomes unacceptable.

The VOC is defined as the weight per volume of any compound of carbon which evaporates from a paint or related coating material under the specific conditions for the determination of the non-volatile content of that material. This does not include water which is volatile under the test conditions. Thus, the water content of the material undergoing analysis must be determined. To obtain the VOC of a sample, the non-volatile content, water content and the density of the material are determined. The VOC number is calculated by correcting the total organic volatile content for the water content and dividing by the volume of the paint corrected for the waer content. The determination of the VOC is by ASTM D-3960 testing which entails heating the paint or related coating material at 110° C. for 1 hour.

Appearance is defined in terms of distinctness of image (DOI) which is measured by a Dori-Gon Meter D47-6 manufactured by Hunter Laboratories.

DETAILED DESCRIPTION OF THE INVENTION

The coating compositions of this invention can have a sprayable solids content of about 45 percent or higher and preferably about 80 percent or higher, and VOC of less than 3.6 pounds per gallon, preferably less than 3 pounds per gallon and and down to about 1.8 pounds per gallon. As described more fully below, the components of the composition are selected on the basis that would result in high solids coating compositions having properties as described herein.

The polyepoxides useful herein are of low molecular weight. Typically, the polyepoxides contain more than two and preferably three or more epoxy groups per molecule. The polyepoxides have epoxide equivalent weights of about 50 to 1000 and preferably about 125 to 500. Typical but non-limiting examples of the polyepoxides are epoxy condensation resins such as glycidyl ethers, esters, acrylic polymers or isocyanates; epoxidized oils; cycloaliphatic epoxies or a mixture thereof.

Illustrative examples of the preferred glycidyl ethers are glycerol polyglycidyl ether (having about 3 epoxy groups); trimethylolpropane polyglycidyl ether (having about 3 epoxy groups); diglycerol polyglycidyl ether (having about 3 epoxy groups); sorbitol polyglycidyl ether (having about 3 epoxy groups), such as is available from Nagase America Corporation under the tradename DENACOL.

Illustrative examples of the glycidyl acrylic polymers are copolymers of ethylenically unsaturated monomers at least one of which contains a glycidyl group. The copolymers are prepared by free radical polymerization of the ethylenically unsaturated monomers. Examples of the ethylenically unsaturated monomers containing a glycidyl group can be a glycidyl acrylate, a glycidyl methacrylate, and an allyl glycidyl ether. The other copolymerizable monomer can be alkyl esters of acrylic or methacrylic acid, e.g., ethyl acrylate, butyl acrylate or 2-ethylhexyl acrylate, ethyl methacrylate, butyl methacrylate and the like; vinyl monomers such as styrene, vinyl toluene and the like.

The polyepoxides can be aromatic or aliphatic with the aliphatic ones being preferred. Also, the polyepoxides can be in the form of solids or liquids, with the liquids being preferred.

The hydroxyl group-containing polyfunctional material useful herein are of low molecular weight and typically contain more than two hydroxyl groups and preferably three or more hydroxyl groups and more preferably four or more hydroxyl groups per molecule. The hydroxyl group-containing polyfunctional materials can have a hydroxyl value of about 30 to 1000 and preferably about 75 to 300. Typical, but non-limiting examples thereof are polyols which can be selected from the group consisting of simple polyols and polymeric polyols such as polyester polyols, polyether polyols, polyurethane polyols, acrylic polyols or a mixture thereof. Illustratively the polyester polyols can be prepared by reacting polyacids or their anhydrides, e.g., hexahydrophthalic anhydride, with polyols, or their equivalents, e.g., trimethylolpropane.

The term hydroxy group-containing polyfunctional material describes a material which contains at least one hydroxyl group and another reactive functional group. Hence, the likes of hydroxy acids can be described herein as a hydroxy group-containing polyfunctional materials.

The anhydrides useful herein are of low molecular weight, and are typically polyacid anhydrides comprising monoanhydrides. The molecular weight of the anhydrides can be in the range of about 100 to 500 and preferably about 100 to 200. Examples of the monoanhydrides are alkyl hexahydrophthalic anhydride wherein the alkyl group has up to 7 carbon atoms. A particularly preferred monoanhydride is methyl hexahydrophthalic anhydride. Other anhydrides that can be used include aliphatic, including cycloaliphatic, olefinic and cycloolefinic anhydrides and aromatic anhydrides. Substituted aliphatic and aromatic anhydrides are also included within the definition of aliphatic and aromatic provided the substituents do not adversely affect the reactivity of the anhydride or the properties of the resultant polyesters. Examples of substituents would be chloro, alkyl and alkoxy. Examples of the anhydrides include succinic anhydride, methylsuccinic anhydride, dodecenylsuccinic anhydride, octadecenylsuccinic anhydride, phthalic anhydride, tetrahydrophthalic anhydride, methyltetrahydrophthalic anhydride, hexahydrophthalic anhydride, alkylhexahydrophthalic anhydrides such as methylhexahydrophthalic anhydride, tetrachlorophthalic anhydride, endomethylene tetrahydrophthalic anhydride, chlorendic anhydride, isotonic anhydride, citraconic anhydride and maleic anhydride. In the preferred embodiment of the invention, the polyacid anhydrides consist essentially of monoanhydrides such as described herein above.

The cure catalysts can be selected from the group consisting of onium compounds such as quaternary ammonium salt, e.g., tetrabutylammonium bromide, or tetrabutylammonium fluoride, phosphonium salts; or tertiary amines such as dimethyldodecylamine and dimethylethanolamine and the like.

In accordance with the description of the invention, the components of the coating composition are of such a functionality that the coating composition can be heated to a temperature sufficient to provide effective cure. Illustratively, the polyepoxide may contain two or more epoxy groups per molecule and the polyol may contain two or more hydroxyl groups per molecule with the proviso the sum of the epoxy and hydroxyl functionalities is greater than four and preferably is about five or higher. In the particularly preferred embodiment of the invention wherein the coating compositions cure effectively to provide good solvent resistance and hardness and also provide the remarkable appearance described herein, it is preferred to employ respectively polyepoxides and polyols having high functionality of three or more.

The proportion in which the components are employed is such as leads to the formation of a gellable composition that can cure effectively. Hence, the equivalent ratio of the anhydride to the hydroxyl group can be from about 0.5 to 20:1 and preferably 1 to 5:1. The equivalent ratio of the polyepoxide to the anhydride can be from about 0.5 to 2:1 and preferably 0.8 to 2:1. The cure catalyst is employed in an amount of 0.2 to 10 percent by weight and preferably 0.5 to 5 percent by weight based on resin solids.

The aforedescribed components can be formulated into the claimed coating compositions which are typically solvent based. Unlike the case of art-related coating compositions other curing agents such as aminoplasts, e.g., melamines are not required to provide effective cure. Accordingly, the claimed invention can be said encompass thermosetting high solids coating compositions to consisting essentially of a polyepoxide, a polyol, and an anhydride as a curing agent. It is, however, desired to point out that while the likes of aminoplasts are not required to effect cure, they can nonetheless be employed as coating additives in less than the art-required curing amount.

It is a distinct feature of the invention that the claimed thermosetting coating compositions are free of, or substantially free of other curing agents, particularly melamine resins. This feature of the invention is all the more significant in the particularly preferred embodiment, wherein appearance is an important property. In this embodiment, the coating compositions typically contain cure catalysts such as tertiary amines or quaternary ammonium salts. Accordingly in this embodiment the coating compositions consist essentially of the polyepoxides, the polyfunctional hydroxyl group containing material, the anhydride and the cure catalyst.

In the coating formulation, additives such as ultraviolet light absorbers and/or stabilizers, flow control agents, antioxidants, plasticizers sag control agents and the like can be employed added to the coating composition. These additives can be employed in amounts up to about 25 percent by weight based on the total resin weight.

It is envisaged that the coating compositions of this invention can be practiced as multi-pack such as a two-pack coating compositions. For example, the polyepoxide, polyol can be contained in one pack, and the anhydride and cure catalyst can be contained in another.

The coating composition can be applied to a substrate by any of the conventional coating techniques such as brushing, spraying, dipping or flowing, but is preferred that spray applications be used since this gives the best appearance. Any of the known spray techniques may be employed such as compressed air spraying, electrostatic spraying and either manual or automatic methods which are preferred.

It is a distinct feature of the invention that the high solids thermosetting coating compositions of this invention display acceptably good sag control at a film thickness up to about 2 mils. Thus, relatively lower amounts of sag control agents need to be added to the coating composition. Therefore, these coating compositions do not suffer a reduced solids content, as is otherwise the case the art-related high solids compositions wherein sag control agents are added.

After application of the coating composition to the substrate, the coated substrate is heated to cure the coating. In the curing operation, solvents are driven off and the film-forming material of the top coat and/or of the base coat is cured. The curing operation is usually carried out at a temperature in the range of from 160°–350° F. (71°–177° C.) but if needed lower or higher temperatures may be used depending upon whether it is sufficient to to provide effective cure. The thickness of the coating is usually from about 1 to 5, preferably 1.2 to 3 mils.

Preferably, the compositions of the present invention, particularly those prepared with the aliphatic polyepoxides, are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent top coat over the base coat.

The film-forming composition of the base coat can be any of the compositions useful in coating applications, particularly automotive applications in which the color-plus-clear coating applications are finding their most use. A film-forming composition conventionally comprises a resinous binder and a pigment to act as a colorant. Particularly useful resinous binders are acrylic polymers, polyesters including alkyds and polyurethanes. The resinous binder for the base coat can be an organic solvent-based material such as those described as U.S. Pat. No. 4,220,679, note column 2, line 24, continuing through column 4, line 40. Also, water-based coating compositions such as those described in U.S. Pat. No. 4,403,003 and U.S. Pat. No. 4,147,679 can also be used as the binder in the base coat composition. The resinous binder for the base coat can also be the same as those of the present invention.

The base coat composition also contains pigments including metallic pigmentation to give it color. Examples of suitable pigmentations for the base coat are described in the aforementioned U.S. Pat. Nos. 4,220,679; 4,403,003 and 4,147,679.

Optional ingredients in the base coat composition are those which are well known in the art of formulating surface coatings and include surfactants, flow control agents, thixotropic agents, fillers, anti-gassing agents, organic co-solvents, catalysts and other customary auxiliaries. Examples of these materials and suitable amounts are described in the aforementioned U.S. Pat. Nos. 4,220,679; 4,403,003 and 4,147,679, but they are most often applied by spraying. The coating can be applied by air spraying and electrostatic spraying in either manual, or automatic methods which are preferred.

During application of the base coat to the substrate, a film of the base coat is formed on the substrate typically in a thickness of about 0.1 to 5 and preferably about 0.1 to 2 mils. After forming a film of the base coat on the substrate, solvent, that is, organic solvent and/or water, is driven out of the base coat film by heating or simply an air drying period before application of the clear coat. Preferably, the heating step will be for a short period of time sufficient to insure that the clear top coat composition can be applied to the base coat without the former dissolving the base coat composition, that is, "striking in". Suitable drying conditions will depend on the particular base coat composition, on the ambient humidity with certain water-based compositions, but in general a drying time of from about 1 to 5 minutes at a temperature of about 80°–175° C. (20°–79° C.) will be adequate to insure that mixing of the two coats is minimized. At the same time, the base coat film is adequately wetted by the clear top coat composition so that satisfactory intercoat adhesion can be obtained. Also, more than one base coat and more than one top coat may be applied to develop optimum appearance. Usually between coats, the previously applied base coat or top coat is flashed, that is, exposed to ambient conditions for about 1 to 20 minutes.

The clear top coat composition may be applied to the base coat by any of the conventional coating techniques mentioned above, although spray applications are typical. As mentioned above, the clear top coat is applied to the base coat via a wet-on-wet technique before the base coat has been cured. The two coatings are then heated to a temperature sufficient to cure and conjointly harden both coating layers. Curing conditions such as described above can be used. In the preferred embodiments of the invention, the cured coatings are hard, solvent resistant and possess a remarkable appearance with a DOI of 90 to 100 and other desirable film properties.

The invention will be further defined by reference to the following examples. Unless otherwise indicated, all parts are by weight.

EXAMPLE A

This example illustrates a high solids thermosetting clear coating composition and the methods of preparing and using the same.

| Ingredients | Parts by Weight (grams) | Solids |
| --- | --- | --- |
| PACK A | | |
| DENACOL 421[1] | 41.3 | 41.3 |
| Polyester polyol[2] | 18.8 | 13.9 |
| TINUVIN 328[3] | 3.0 | 3.0 |
| Xylene | 5.9 | |

| Ingredients | Parts by Weight (grams) | Solids |
|---|---|---|
| Methyl ethyl ketone | 14.5 | |
| TINUVIN 292[4] | 1.0 | 1.0 |
| Silicone fluid[5] | 0.1 | 0.1 |
| ARMEEN DM 12D[6] | 3.0 | 3.0 |
| Cellulose acetate butyrate | 4.0 | 1.0 |
| PACK B | | |
| Methylhexahydrophthalic anhydride | 44.8 | 44.8 |

[1] Diglycerol polyglycidyl ether from Nagase America Corp.
[2] Tetrahydroxy-functional polyester having a hydroxyl value of about 412.8, an acid value of about 7.8, and is derived from trimethylolpropane and hexahydrophthalic anhydride.
[3] UV absorber available from Ciba Geigy Corp.
[4] UV stabilizer available from Ciba Geigy Corp.
[5] Available as DC 200 10CS from Dow Corning Co.
[6] Dimethyldodecylamine available from Akzo Chemical Co.

The above ingredients were formulated into a clear coating composition by mixing the above ingredients at a low shear with good agitation. The resultant composition had a solids content of 87 percent measured at 110° C. after 60 minutes, and a viscosity of 22 seconds measured with a number 4 Ford cup.

The clear coat was spray applied over a panel of steel substrates that had been electrocoated with UNI-PRIME ® (which is a cationic electrodepositable composition available from PPG Industries, Inc.) and baked at 340° L F. (171° C.) for 30 minutes. The electrocoated panels were spray painted with a base coat (available from ICI Limited as M-979) to a film thickness of 0.3 mil. The panels were then flashed for 3 minutes at 150° F. (66° C.), before the above clear coat was spray applied. The resultant color-plus-clear coat had a film thickness of 1.5 mils, DOI was 90, and Tukon hardness of 9.0.

EXAMPLE B

This example also illustrates the clear coating compositions of this invention and the methods of preparing and using the same.

| Ingredients | Parts by Weight (grams) | Solids |
|---|---|---|
| PACK A | | |
| TINUVIN 328 | 3.0 | 3.0 |
| Xylene | 6 | |
| TINUVIN 292 | 1 | 1.0 |
| Silicone fluid | 1 | |
| ARMEEN DM 12D | 3.0 | 3.0 |
| Cellulose acetate butyrate | 4.0 | 1.0 |
| Tetrahydroxy-functional polyester[1] | 11.4 | 8.4 |
| Epoxy-containing acrylic polymer[2] | 104.0 | 60.3 |
| PACK B | | |
| Methylhexahydrophthalic anhydride | 31.2 | 31.2 |

[1] Same as in Example A.
[2] 40% glycidyl methacrylate/20% methyl methacrylate/20% butyl methacrylate/20% butyl acrylate in xylene; having a solids content of 58.1 percent and an epoxy equivalent of 650.

The above ingredients were formulated by mixing them in the order indicated above at low shear with good agitation. The resultant composition had a determined solids content of 68.7 percent (at 110° C. for 60 minutes) and viscosity of 31.5 seconds measured with a number 4 Ford cup.

The clear coating was spray applied wet-on-wet in a color-plus-clear mode as described in Example A. The resultant coating had a film thickness of 2 mils, DOI 60 and Tukon hardness of 12.75.

EXAMPLE C

This example further illustrates the high solids thermosetting coating compositions of this invention and methods of making and using the same. Notably, the polyol employed herein is an acrylic polyol which was prepared as follows.

| Reactor Charge | |
|---|---|
| Ingredients | Parts by Weight (grams) |
| Hexyl acetate | 615 |
| Feed A | |
| Hydroxypropyl acrylate | 1120 |
| Butyl methacrylate | 1064 |
| Butyl acrylate | 11.2 |
| Styrene | 11.2 |
| Methyl methacrylate | 11.2 |
| Acrylic acid | 22.4 |
| Feed B | |
| Hexyl acetate | 300 |
| 6% LUPERSOL-531-80B[1] | 168 |
| [1] 1,1-di-tertiary-amyl peroxycyclohexane. | |
| Feed C | |
| Hexyl acetate | 15 |
| 0.2% LUPERSOL-531-80B | 5.6 |
| Feed D | |
| Hexyl acetate | 15 |
| 0.2% LUPERSOL-531-80B | 5.6 |
| Feed E | |
| Hexyl acetate | 15 |
| 0.2% LUPERSOL-531-80B | 5.6 |

In a properly equipped reaction vessel, Charge A was heated to reflux. At 165° C., addition of Charge A and Charge B was commenced and carried out over a period of 2 hours and over a temperature range of 165°–158° C. Thereafter, at 158° C., Charges C, D and E were added to the reaction mixture at one-hour intervals followed by holding of the resultant mixture for 1 hour after each addition. The final product was discharged and analyzed. Determined solids at 110° C. was 69 percent, viscosity was 17.5 stokes, theoretical acid value was 5.45, theoretical hydroxyl value was 151 and molecular weight was 3862.

A coating composition of the above acrylic polyol, epoxy resin and an anhydride was prepared as follows.

| Ingredients | Parts by Weight (grams) | Solids |
|---|---|---|
| PACK A | | |
| TINUVIN 328 | 3.0 | 3.0 |
| Xylene | 16.9 | |
| TINUVIN 292 | 1.0 | 1.0 |
| Silicone fluid (DC 200 10CS) | 0.1 | 0.1 |
| ARMEEN DM 12D | 3.0 | 3.0 |
| Acrylic polyol as described in Example C | 38.7 | 38.7 |
| EPIREZ 5044 | | |
| PACK B | | |
| Methylhexahydrophthalic anhydride | 39.7 | 39.7 |

[1] An epoxy resin having low molecular weight and an epoxy equivalent of 165, which is available from Celanese Corp.

The above ingredients were formulated by mixing them in the order indicated above at low shear with good agitation. The resultant composition had a determined solids content of 74.7 percent (at 110° C. over 60 minutes) and a viscosity of 23 seconds measured with a number 4 Ford cup.

The clear coating was spray applied wet-on-wet in a color-plus-clear mode as described in Example A. The resultant coating had a film thickness of 1.8 mils and a DOI of 100.

What is claimed is:

1. A high solids thermosetting coating composition comprising:
   (a) a low molecular weight polyepoxide containing more than 2 epoxy groups per molecule,
   (b) a low molecular weight hydroxyl group-containing polyfunctional material,
   (c) a curing agent consisting essentially of an anhydride, and
   (d) a cure catalyst selected from the group consisting of tertiary amine and a quaternary ammonium salt; said composition is characterized in that it is sprayable, has a solids content of about 45 to 80 percent and is curable in the absence of a melamine curing agent.

2. A high solids thermosetting coating composition of claim 1 wherein the polyepoxide comprises three or more epoxy groups per molecule.

3. A high solids thermosetting coating composition of claim 1 wherein the polyepoxide has an epoxy equivalent weight of about 50 to 1000.

4. A high solids thermosetting coating composition of claim 1, wherein the polyepoxide is selected from the group consisting glycidyl ethers, glycidyl esters, glycidyl acrylic polymers, glycidyl isocyanates, epoxidized oils, cycloaliphatic epoxides and a mixture thereof.

5. A high solids thermosetting composition of claim 1, wherein the hydroxyl equivalent weight of the hydroxy group-containing polyfunctional material is from about 30 to 1000.

6. A high solids thermosetting coating composition of claim 1, wherein the polyol comprises three or more hydroxyl groups per molecule.

7. A high solids thermosetting coating composition of claim 1, wherein the polyol is selected from the group consisting of simple polyols, or polymeric polyol selected from the group consisting of polyester polyols, polyether polyols, polyurethane polyols, acrylic polyols and a mixture thereof.

8. A high solids thermosetting coating composition of claim 1 wherein the anhydride curing agent is a polyacid anhydride comprising a monoanhydride.

9. A high solids thermosetting coating composition of claim 8 wherein the anhydride is an alkyl hexahydropthalic anhydride wherein the alkyl group contains up to about seven carbon atoms.

10. A high solids thermosetting coating composition of claim 9 wherein the anhydride is methyl hexahydropthalic anhydride.

11. A high solids thermosetting coating composition of claim 1 having VOC of 3.6 pounds per gallon or less.

12. An article of matter which is prepared by applying to the surface of a substrate the coating composition of claim 1.

* * * * *